US012183295B2

(12) United States Patent
Deng et al.

(10) Patent No.: US 12,183,295 B2
(45) Date of Patent: Dec. 31, 2024

(54) GOA CIRCUIT AND DISPLAY PANEL CONFIGURED TO MAINTAIN NORMAL SIGNAL STAGE TRANSMISSION DURING DISPLAY PERIOD AND REDUCE CHARGE LEAFKAGE DURING TOUCH PERIOD

(71) Applicant: Guangzhou China Star Optoelectronics Semiconductor Display Technology Co., LTD., Guangdong (CN)

(72) Inventors: Minghu Deng, Guangdong (CN); Xinru Yao, Guangdong (CN)

(73) Assignee: Guangzhou China Star Optoelectronics Semiconductor Display Technology Co., LTD., Guangzhou (CN)

( * ) Notice: Subject to any disclaimer, the term of this patent is extended or adjusted under 35 U.S.C. 154(b) by 0 days.

(21) Appl. No.: 18/228,045

(22) Filed: Jul. 31, 2023

(65) Prior Publication Data

US 2024/0386858 A1 Nov. 21, 2024

(30) Foreign Application Priority Data

May 15, 2023 (CN) ........................ 202310548374.6

(51) Int. Cl.
*G09G 3/36* (2006.01)

(52) U.S. Cl.
CPC ....... *G09G 3/36* (2013.01); *G09G 2310/0286* (2013.01)

(58) Field of Classification Search
CPC ...... G09G 3/36; G09G 3/3611; G09G 3/3648; G09G 3/3674–3681; G09G 2300/0408; G09G 2300/0426; G09G 2310/0202; G09G 2310/0267; G09G 2310/0286; G09G 2310/08; G06F 3/04166; G06F 3/04184; G11C 19/18–188
See application file for complete search history.

(56) References Cited

U.S. PATENT DOCUMENTS

| | | | | |
|---|---|---|---|---|
| 2015/0002504 | A1* | 1/2015 | Jo | G09G 3/3677 345/99 |
| 2018/0308444 | A1* | 10/2018 | Sueki | G09G 3/3674 |
| 2019/0311691 | A1* | 10/2019 | Feng | G09G 3/36 |
| 2019/0355433 | A1* | 11/2019 | Liang | G09G 3/3674 |
| 2020/0074907 | A1* | 3/2020 | Tagawa | G11C 19/28 |

(Continued)

*Primary Examiner* — Keith L Crawley

(57) ABSTRACT

A gate driver on array (GOA) circuit includes a plurality of GOA units in cascade. Each of the GOA units includes a pull-up control module, a pull-up module, a capacitor module, pull-down maintenance module, a pull-down module, and a GOA drive shutdown module. The pull-up control module is connected to a signal output terminal G(N−3) of a (N−3) stage GOA unit, a constant-voltage high-potential signal terminal, and a first node, wherein N is a natural number. The gate shutdown signal terminal is configured to provide a low potential signal during a display period and is configured to provide a high potential signal during a touch period, when the gate shutdown signal terminal provides the low potential signal, the pull-down maintenance module maintains a pull-down maintenance function, and when the gate shutdown signal terminal provides the high potential signal, the pull-down maintenance module becomes is disabled.

20 Claims, 4 Drawing Sheets

(56) References Cited

U.S. PATENT DOCUMENTS

| | | | | |
|---|---|---|---|---|
| 2020/0193886 | A1* | 6/2020 | Hao | G09G 3/36 |
| 2021/0335305 | A1* | 10/2021 | Mi | G11C 19/28 |
| 2022/0238056 | A1* | 7/2022 | Liu | G06F 3/0443 |
| 2022/0319387 | A1* | 10/2022 | Fang | G06F 3/04184 |

* cited by examiner

GOA CIRCUIT AND DISPLAY PANEL CONFIGURED TO MAINTAIN NORMAL SIGNAL STAGE TRANSMISSION DURING DISPLAY PERIOD AND REDUCE CHARGE LEAFKAGE DURING TOUCH PERIOD

RELATED APPLICATION

This application claims the benefit of priority of Chinese Patent Application No. 202310548374.6, filed on May 15, 2023, the contents of which are incorporated herein by reference in its entirety.

FIELD AND BACKGROUND OF THE INVENTION

The present application relates to the field of display technology, in particular to a GOA circuit and a display panel.

With the rapid development of display technology, touch display panels have been widely accepted and used by people. For example, smart phones, tablet computers, etc. all use touch display panels (touch panel technology). The touch display panel is a combination of a touch panel and a liquid crystal panel, so that the liquid crystal panel has functions of displaying and sensing touch input at the same time. According to the position of a touch sensor, the touch display panel can be divided into out cell (the touch sensor is plugged outside the display panel), on cell (the touch sensor is set on the display panel) and in cell (the touch sensor is integrated in the display panel) and other technical architectures.

The driving architecture of the in-cell touch display panel uses a gate driver circuit (gate driver on array, GOA) to provide a gate driving signal required by the panel, so that the touch display panel can work normally. However, the in cell type touch display panel needs to have a signal stop function. That is, it is necessary to suspend a stage transmission of the GOA circuit during a touch period. Therefore, how to maintain the charge of the GOA circuit without leakage during the touch period is a key issue.

SUMMARY OF THE INVENTION

The present application provides a GOA circuit and a display panel, which can maintain normal signal stage transmission during a display period and reduce a charge leakage of the GOA circuit during a touch period.

In a first aspect, the present application provides a GOA circuit, wherein the GOA circuit comprises a plurality of GOA units in cascade, each of the GOA units comprises a pull-up control module, a pull-up module, a capacitor module, pull-down maintenance module, a pull-down module, and a GOA drive shutdown module;

- wherein the pull-up control module is connected to a signal output terminal G(N−3) of a (N−3)th stage GOA unit, a constant-voltage high-potential signal terminal, and a first node, wherein N is a natural number;
- wherein the pull-up module is connected to a clock signal line, the first node, and a second node;
- wherein the capacitor module is connected to the first node and the second node;
- wherein the pull-down maintenance module is connected to the constant-voltage high-potential signal terminal, the first node, the second node, a third node, and a fourth node, wherein the third node is connected to a gate shutdown signal terminal, and the fourth node is connected to a constant-voltage negative-potential signal terminal;
- wherein the pull-down module is connected to a signal output terminal G(N+4) of a (N+4)th stage GOA unit, the first node, and the third node;
- wherein the GOA drive shutdown module is connected to a gate shutdown signal terminal, the second node, and the fourth node;
- wherein the gate shutdown signal terminal is configured to provide a low potential signal during a display period and is configured to provide a high potential signal during a touch period, when the gate shutdown signal terminal provides the low potential signal, the pull-down maintenance module maintains a pull-down maintenance function, and when the gate shutdown signal terminal provides the high potential signal, the pull-down maintenance module becomes is disabled.

In a possible implementation of the present application, the pull-up control module comprises an eleventh thin film transistor, a first terminal of the eleventh thin film transistor is connected to the signal output terminal G(N−3) of the (N−3)th stage GOA unit, a second terminal of the eleventh thin film transistor is connected to the constant-voltage high-potential signal terminal, and a third terminal of the eleventh thin film transistor is connected to the first node.

In a possible implementation of the present application, the pull-up module comprises a twenty-first thin film transistor, a first terminal of the twenty-first thin film transistor is connected to the first node, a second terminal of the twenty-first thin film transistor is connected to the clock signal line, and a third terminal of the twenty-first thin film transistor is connected to the second node.

In a possible implementation of the present application, the pull-down module comprises a forty-first thin film transistor, a first terminal of the forty-first thin film transistor is connected to the signal output terminal G(N+4) of the (N+4)th stage GOA unit, a second terminal of the forty-first thin film transistor is connected to the first node, and a third terminal of the forty-first thin film transistor is connected to the third node.

In a possible implementation of the present application, the pull-down maintenance module comprises a fifty-first thin film transistor, a fifty-second thin film transistor, a fifty-third thin film transistor, a fifty-fourth thin film transistor, a fifty-fifth thin film transistor, a fifty-sixth thin film transistor, and a forty-second thin film transistor;

- wherein a first terminal and a second terminal of the fifty-first thin film transistor are connected to the constant-voltage high-potential signal terminal, and a second terminal of the fifty-first thin film transistor is connected to a fifth node;
- wherein a first terminal of the fifty-second thin film transistor is connected to the first node, a second terminal of the fifty-second thin film transistor is connected to the fifth node, and a third terminal of the fifty-second thin film transistor is connected to the fourth node;
- wherein a first terminal of the fifty-third thin film transistor is connected to the fifth node, a second terminal of the fifty-third thin film transistor is connected to the constant-voltage high-potential signal terminal, and a third terminal of the fifty-third thin film transistor is connected to a sixth node;
- wherein a first terminal of the fifty-fourth thin film transistor is connected to the first node, a second terminal of the fifty-fourth thin film transistor is connected to the sixth node, and a third terminal of the fifty-fourth thin film transistor is connected to the fourth node;

wherein a first terminal of the fifty-fifth thin film transistor is connected to the third node, a second terminal of the fifty-fifth thin film transistor is connected to the fifth node, and a third terminal of the fifty-fifth thin film transistor is connected to the fourth node;

wherein a first terminal of the fifty-sixth thin film transistor is connected to the third node, a second terminal of the fifty-sixth thin film transistor is connected to the sixth node, and a third terminal of the fifty-sixth thin film transistor is connected to the fourth node;

wherein a first terminal of the forty-second thin film transistor is connected to the sixth node, a second terminal of the forty-second thin film transistor is connected to the first node, and a third terminal of the forty-second thin film transistor is connected to the third node.

In a possible implementation of the present application, the pull-down maintenance module further comprises a thirty-second thin film transistor, a first terminal of the thirty-second thin film transistor is connected to the sixth node, a second terminal of the thirty-second thin film transistor is connected to the second node, and a third terminal of the thirty-second thin film transistor is connected to the fourth node.

In a possible implementation of the present application, the GOA drive shutdown module comprises a drive shutdown thin film transistor, a first terminal of the drive shutdown thin film transistor is connected to the gate shutdown signal terminal, a second terminal of the drive shutdown thin film transistor is connected to the second node, and a third terminal of the drive shutdown thin film transistor is connected to the fourth node.

In a possible implementation of the present application, the GOA circuit further comprises a first reset thin film transistor, a first terminal of the first reset thin film transistor is connected to a reset signal terminal, a second terminal of the first reset thin film transistor is connected to the first node, and a third terminal of the first reset thin film transistor is connected to the fourth node.

In a possible implementation of the present application, the GOA circuit further comprises a second reset thin film transistor, a first terminal of the second reset thin film transistor is connected to a reset signal terminal, a second terminal of the second reset thin film transistor is connected to the second node, and a third terminal of the second reset thin film transistor is connected to the fourth node.

In a second aspect, the present application provides a display panel, wherein the display panel comprises a plurality of rows of sub-pixels and the GOA circuit according to the first aspect, wherein the GOA circuit is electrically connected to the plurality of rows of sub-pixels and configured to drive the plurality of rows of sub-pixels to emit light.

In a possible implementation of the present application, a timing of the GOA circuit comprises a time-division multiplexing timing configured to divide one frame time into a plurality of display periods and touch periods.

In a possible implementation of the present application, the GOA circuit is driven by a touch and display driver integration (TDDI).

During the display period, the GOA circuit of the present application provides a low potential signal through the gate shutdown signal terminal so that the pull-down maintenance module maintains the pull-down maintenance function. The periodic clock signal and the output signal of the previous stage are used to control the pull-up control module to charge the capacitor module of the first node. The periodical clock signal and the voltage of the first node are configured to control the opening or closing of the pull-up module. When the periodic clock signal becomes high potential, the output signal terminal G(N) of the GOA is synchronously made to be high potential, thereby effectively turning on the corresponding pixel TFT. The pull-down maintenance module is configured to maintain the output signal terminal G(N) of the GOA at a low potential so that the corresponding pixel TFT can be effectively turned off. During the touch period, a high potential signal is provided through the gate shutdown signal terminal to disable the pull-down maintenance module. At the same time, the GOA drive shutdown module is turned on, and the failure of the pull-down maintenance module suppresses the leakage of the first node. The output signal terminal G(N) of Nth stage GOA unit is pulled down to the low potential provided by the constant-voltage negative-potential signal terminal through the GOA drive shutdown module. Therefore, during the touch period, the output signal of the output signal terminal G(N) of the Nth stage GOA unit is kept inputting a low voltage to the pixel TFT. Therefore, the GOA circuit of the present application can maintain normal signal stage transmission during the display period and can reduce the charge leakage of the GOA circuit during the touch period.

BRIEF DESCRIPTION OF THE SEVERAL VIEWS OF THE DRAWINGS

In order to illustrate the technical solutions more clearly in the embodiments of the present application, the following briefly introduces the drawings that need to be used in the description of the embodiments. Obviously, the drawings in the following description are only some embodiments of the present invention. For those skilled in the art, other drawings can also be obtained based on these drawings without any creative effort.

DESCRIPTION OF SPECIFIC EMBODIMENTS OF THE INVENTION

The technical solutions in the embodiments of the present application will be clearly and completely described below in conjunction with the drawings in the embodiments of the present application. Apparently, the described embodiments are only some of the embodiments of the present invention, but not all of them. Based on the embodiments of the present invention, all other embodiments obtained by those skilled in the art without creative efforts fall within the protection scope of the present invention.

In the description of the present invention, it should be understood that the terms "first" and "second" are used for description purposes only and cannot be interpreted as indicating or implying relative importance or implicitly indicating the quantity of indicated technical features. Thus, a feature defined as "first" or "second" may explicitly or implicitly include one or more of said features. In the description of the present invention, "plurality" means two or more, unless otherwise specifically defined.

In this application, the word "exemplary" is used to mean "serving as an example, illustration, or explanation". Any embodiment described in this application as "exemplary" is not necessarily to be construed as preferred or advantageous over other embodiments. The following description is given to enable any person skilled in the art to make and use the invention. In the following description, details are set forth for purposes of explanation. It should be understood that one of ordinary skill in the art would recognize that the present invention may be practiced without the use of these specific details. In other instances, well-known structures and procedures are not described in detail to avoid obscuring the description of the present invention with unnecessary detail. Thus, the present invention is not intended to be limited to the embodiments shown but is to be accorded the widest scope consistent with the principles and features disclosed in this application.

Figure 1:
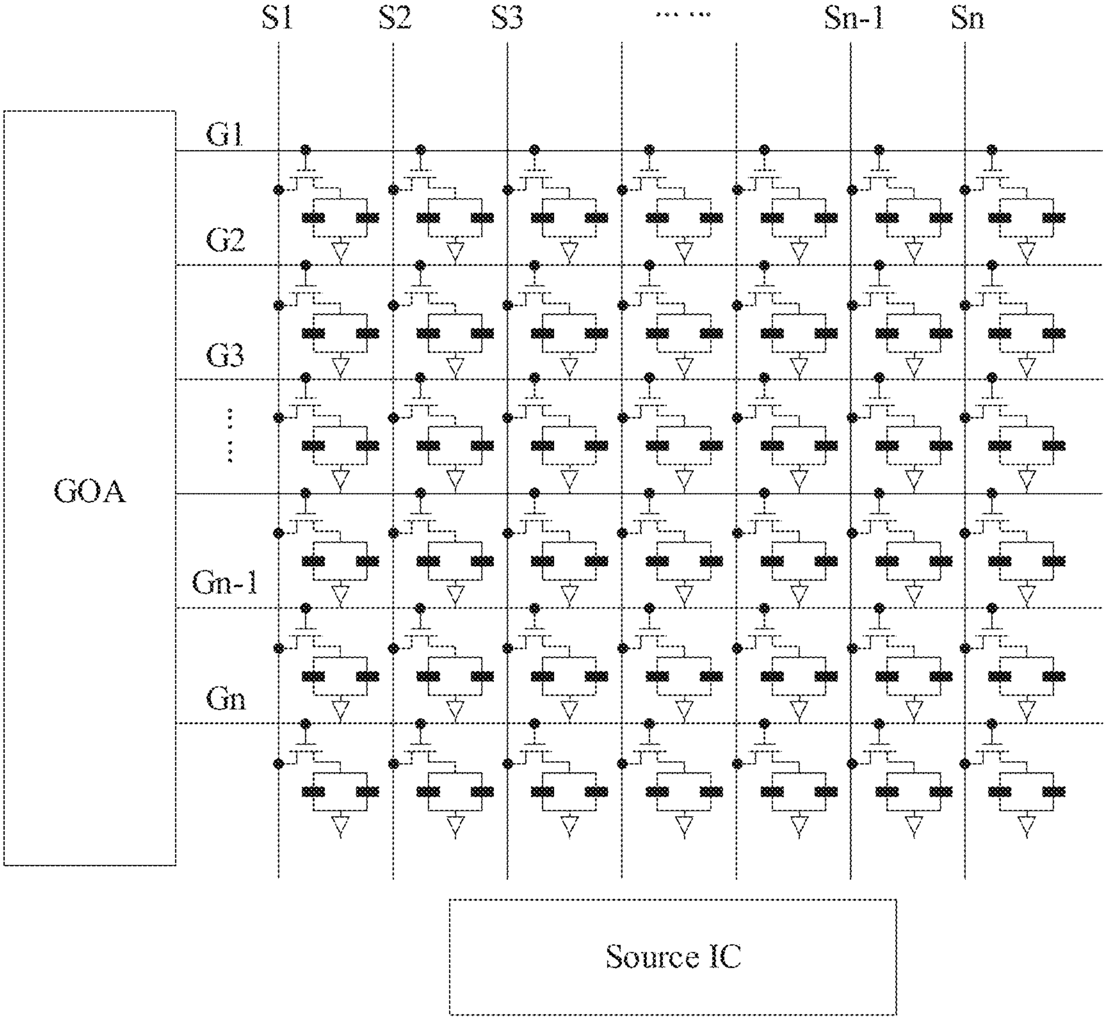
FIG. 1 Prior Art
FIG. 1 is a schematic structural diagram of a display panel circuit in the prior art of the present application.

FIG. 1 is a schematic diagram of a display panel circuit in the prior art. The display panel circuit includes an array substrate row driver (gate driver on array, GOA) circuit, a source driver chip (source IC), and a thin film transistor (pixel TFT) corresponding to each pixel. The GOA circuit includes multiple GOA units (G1, G2, G3 . . . . Gn−1, and Gn) in cascade. Each GOA unit is configured to drive a row of pixel TFTs. The source IC includes multiple source cells (S1, S2, S3 . . . . Sn−1, and Sn). Each source unit is configured to provide power to a column of pixel TFTs.

With the rapid development of display technology, touch display panels have been widely accepted and used by people. For example, smart phones, tablet computers, etc. all use touch display panels (touch panel technology). The touch display panel is a combination of a touch panel and a liquid crystal panel, so that the liquid crystal panel has functions of displaying and sensing touch input at the same time. According to the position of a touch sensor, the touch display panel can be divided into out cell (the touch sensor is plugged outside the display panel), on cell (the touch sensor is set on the display panel) and in cell (the touch sensor is integrated in the display panel) and other technical architectures.

In-cell touch display panels need to have a signal stop function. That is, during a display period, when the GOA circuit is working normally, it is necessary to close output terminals of all stages of GOA units in the GOA circuit during a touch period and stop an output of a gate scanning driving signal to perform touch scanning. After the touch scan ends, the GOA circuit returns to normal during the display period and continues to output gate scanning driving signals.

Figure 2:
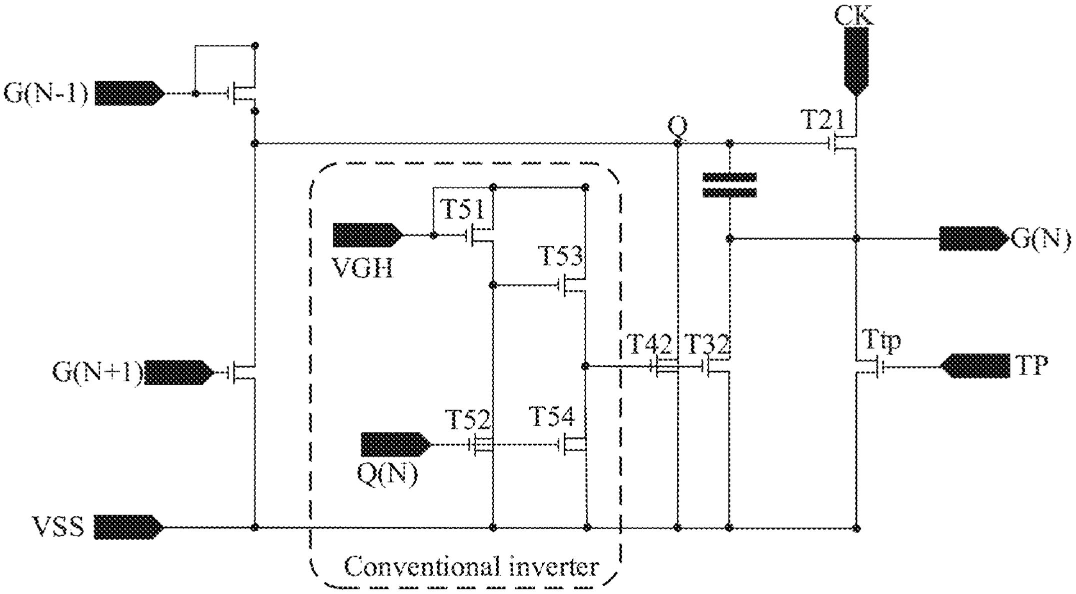
FIG. 2 Prior Art
FIG. 2 is a schematic structural diagram of a GOA circuit provided in an embodiment of the present application.
Figure 3:
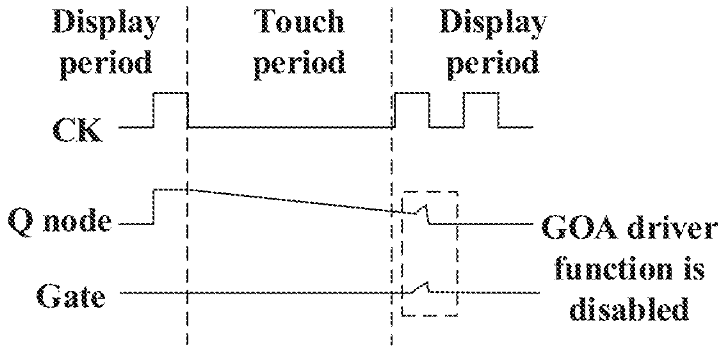
FIG. 3 Prior Art
FIG. 3 is a timing diagram of a GOA circuit provided in an embodiment of the present application.

In a conventional GOA circuit shown in FIG. 2, there is a long touch period between two display periods. Because a control node (Q point) needs to maintain a high potential after the touch period, the GOA circuit stage is pulled up again to re-display. As shown in FIG. 3, in a circuit timing of the GOA circuit, the Q point maintains a high potential during the touch period, which is prone to leakage.

In order to solve the above problems, embodiments of the present application provide a GOA circuit and a display panel, which will be described in detail below.

Figure 4:
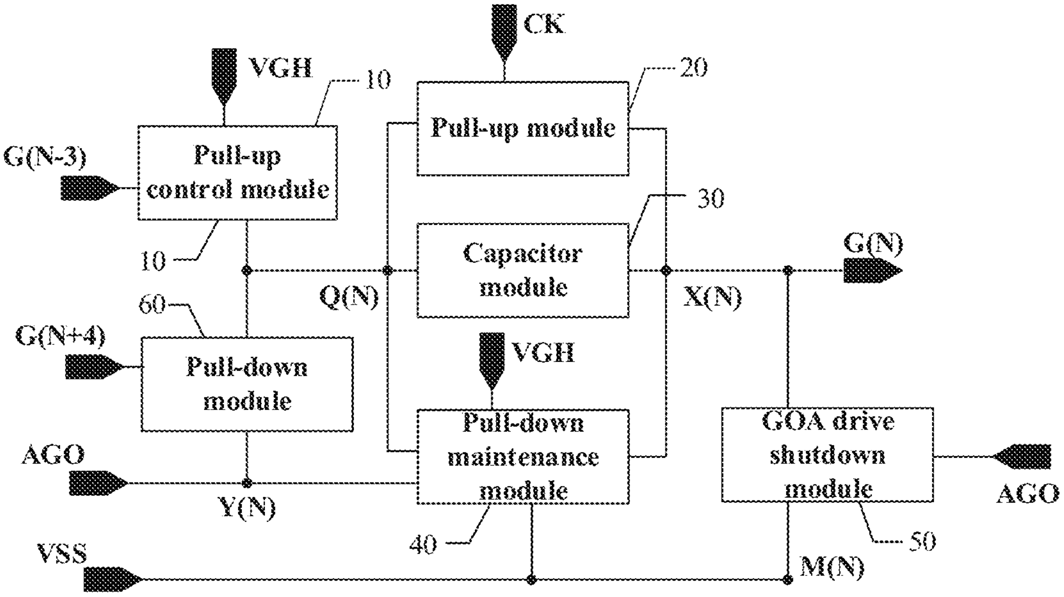
FIG. 4 is a schematic structural diagram of an embodiment of a GOA circuit provided in an embodiment of the present application.

As shown in FIG. 4, which is a schematic structural diagram of an embodiment of a GOA circuit in an embodiment of the present application. The GOA circuit includes a plurality of GOA units in cascade. Each GOA unit includes a pull-up control module 10, a pull-up module 20, a capacitor module 30, a pull-down maintenance module 40, a pull-down module 60, and a GOA drive shutdown module 50.

If the Nth stage GOA unit is a GOA unit after the first three stages, the pull-up control module 10 is connected to the signal output terminal G(N−3) of the (N−3)th stage GOA unit, a constant-voltage high-potential signal terminal VGH, and a first node Q(N), wherein N is a natural number.

The pull-up module 20 is connected to a clock signal line CK, the first node Q(N), and a second node X(N). The capacitor module 30 is connected to the first node Q(N) and the second node X(N). In this embodiment, the capacitor module 30 includes a capacitor Cbt. Both ends of the capacitor Cbt are respectively connected to the first node Q(N) and the second node X(N).

The pull-down maintenance module 40 is connected to the constant-voltage high-potential signal terminal VGH, the first node Q(N), the second node X(N), a third node Y(N), and a fourth node M(N). The third node Y(N) is connected to a gate shutdown signal terminal AGO, and the fourth node M(N) is connected to a constant-voltage negative-potential signal terminal VSS.

The pull-down module 60 is connected to the signal output terminal G(N+4) of the (N+4)th stage GOA unit, the first node Q(N), and the third node Y(N).

The GOA driving shutdown module 50 is connected to the gate shutdown signal terminal AGO, the second node X(N), and the fourth node M(N).

The gate shutdown signal terminal AGO is configured to provide a low potential signal during the display period and is configured to provide a high potential signal during the touch period. When the gate shutdown signal terminal AGO provides the low potential signal, the pull-down maintenance module 40 maintains a pull-down maintenance function. When the gate shutdown signal terminal AGO provides the high potential signal, the pull-down maintenance module 40 is disabled.

In this embodiment, during the display period, the gate shutdown signal terminal AGO provides the low potential signal. At this time, the pull-down maintenance module 40 maintains the pull-down maintenance function, and the pull-up control module 10 is controlled to be turned on or off by the output signal of the signal output terminal G(N−3) of the (N−3)th stage GOA unit. The capacitor module 30 at the first node Q(N) is controlled to be charged by a constant-voltage high-potential signal terminal VGH, and the pull-up module 20 is turned on.

With the pull-up module 20 turned on, if the clock signal output by the Nth stage clock signal line CK changes from low potential to high potential, the output signal of the output signal terminal G(N) of the Nth stage GOA unit also becomes high potential synchronously and is input to a panel display area. This drives the pixel TFT corresponding to the corresponding pixel to turn on, charging the pixel with a correct source voltage.

After the pixel TFT in a display area of the panel receives a source voltage, if the clock signal output by the Nth stage clock signal line CK changes from high potential to low potential, the output signal terminal G(N) of the Nth stage GOA unit also becomes low potential synchronously. This enables the pixel TFT to be effectively turned off and effectively latched to the associated source voltage. Therefore, at this time, the first node Q(N) needs to continue to maintain the high potential, so that the pull-up module 20 can effectively pull down the potential of the output signal of the output signal terminal G(N) of the Nth stage GOA unit.

After the work of the Nth stage GOA unit is completed, in order to keep the output signal terminal G(N) of the Nth stage GOA unit continuously inputting a low voltage to the pixel TFT, in this application, the low potential of the output signal terminal G(N) of the Nth stage GOA unit is maintained by the pull-down maintenance module 40.

When entering the touch period, a touch sensor of the display panel is activated. At this time, the gate shutdown signal terminal AGO provides a high potential signal, and the pull-down maintenance module 40 is disabled. Further, because the gate shutdown signal terminal AGO provides the high potential signal to provide the high potential signal for the devices in the pull-down maintenance module 40. In this state, the leakage of the first node Q(N) is suppressed, thereby reducing the leakage of the first node Q(N) during the touch period.

Simultaneously, the GOA drive shutdown module 50 is turned on, the output signal terminal G(N) of the Nth stage GOA unit is pulled down to the low potential provided by the constant-voltage negative-potential signal terminal VSS through the GOA drive shutdown module 50. Therefore, the output signal of the output signal terminal G(N) of the Nth stage GOA unit is kept continuously inputting a low voltage to the pixel TFT.

That is, the GOA circuit of this application is in the display period, a low potential signal is provided through the gate shutdown signal terminal AGO so that the pull-down maintenance module 40 maintains the pull-down maintenance function. Use the periodic clock signal and the output signal of the previous stage to control the pull-up control module 10 to charge the capacitor Cbt of the first node Q(N). Use the periodic clock signal and the voltage of the first node Q(N) to control the opening or closing of the pull-up module 20. Further, when the periodic clock signal becomes high potential, the output signal terminal G(N) of the Nth stage GOA unit is synchronously made to be high potential, thereby effectively turning on the corresponding pixel TFT. The pull-down maintenance module 40 is configured to maintain the output signal terminal G(N) of the Nth stage GOA unit at a low potential so that the corresponding pixel TFT can be effectively turned off. During the touch period, a high potential signal is provided through the gate shutdown signal terminal AGO to disable the pull-down maintenance module 40. At the same time, the GOA drive shutdown module 50 is turned on, and the failure of the pull-down maintenance module 40 suppresses the leakage of the first node Q(N). Through the GOA drive shutdown module 50, the output signal terminal G(N) of the Nth stage GOA unit is pulled down to the low potential provided by the constant-voltage negative-potential signal terminal VSS, thereby maintaining the output signal of the Nth stage GOA unit during the touch period. The output signal of terminal G(N) continuously inputs low voltage to the pixel TFT. Therefore, the GOA circuit of the present application can maintain normal signal stage transmission during the display period and can reduce the charge leakage of the GOA circuit during the touch period.

Figure 5:
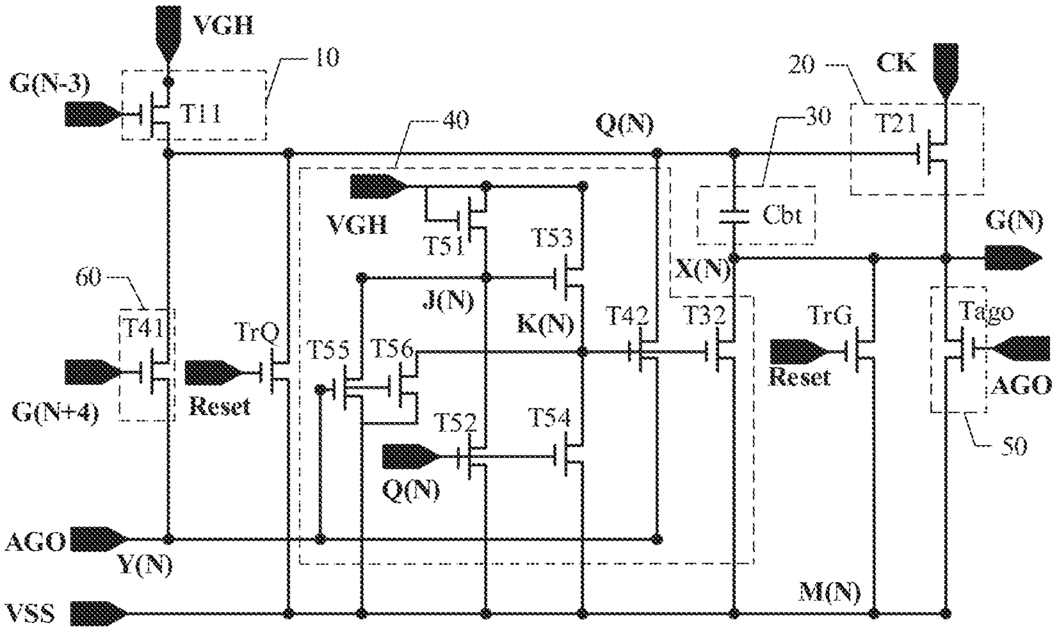
FIG. 5 is a schematic structural diagram of an embodiment of a GOA circuit provided in an embodiment of the present application.

In some embodiments of the present application, as shown in FIG. 5, the pull-up control module 10 includes an eleventh thin film transistor T11. A first terminal of the eleventh thin film transistor T11 is connected to the signal output terminal G(N−3) of the (N−3)th stage GOA unit, a second terminal of the eleventh thin film transistor T11 is connected to the constant-voltage high-potential signal terminal VGH, and a third terminal of the eleventh thin film transistor T11 is connected to the first node Q(N).

Specifically, a gate of the eleventh thin film transistor T11 is connected to the signal output terminal G(N−3) of the (N−3)th stage GOA unit, and a source and a drain of the eleventh thin film transistor T11 are respectively connected to the constant-voltage high-potential signal terminal VGH and the first node Q(N).

In this embodiment, the pull-up module 20 includes a twenty-first thin film transistor T21. A first terminal of the twenty-first thin film transistor T21 is connected to the first node Q(N), a second terminal of the twenty-first thin film transistor T21 is connected to the clock signal line CK, and a third terminal of the twenty-first thin film transistor T21 is connected to the second node X(N).

Specifically, a gate of the twenty-first thin film transistor T21 is connected to the first node Q(N), and a source and a drain of the twenty-first thin film transistor T21 are respectively connected to the clock signal line CK and the second node X(N).

In this embodiment, both the eleventh thin film transistor T11 and the twenty-first thin film transistor T21 are thin film transistors (TFTs).

When the signal output terminal G(N−3) of the (N−3)th stage GOA unit changes from low potential to high potential, the eleventh thin film transistor T11 is turned on, the first node Q(N) is charged through the capacitor Cbt. Until the voltage at the first node Q(N) satisfies the turn-on condition of the twenty-first thin film transistor T21, the twenty-first thin film transistor T21 is turned on. At this time, the output signal terminal G(N) of the Nth stage GOA unit outputs a low voltage according to the low potential input from the Nth stage clock signal line CK.

When the clock signal provided by the Nth stage clock signal line CK changes from low potential to high potential, the capacitor Cbt stops charging. At this time, the output signal terminal G(N) of the Nth stage GOA unit changes from low potential to high potential according to the high potential input of the Nth stage clock signal line CK, so as to effectively turn on the corresponding pixel TFT.

When the clock signal provided by mth stage clock signal line Ckm changes from high potential to low potential, the first node Q(N) remains at a high potential. Therefore, the output signal terminal G(N) of the Nth stage GOA unit changes from high potential to low potential according to the low potential output of the Nth stage clock signal line CK, and at this time, due to the function of the pull-down maintenance module 40, Gout maintains a low potential, so as to effectively turn off the corresponding pixel TFT.

In some embodiments of the present application, the pull-down module 60 includes a forty-first thin film transistor T41. A first terminal of the forty-first thin film transistor T41 is connected to the signal output terminal G(N+4) of the (N+4)th stage GOA unit, a second terminal of the forty-first thin film transistor T41 is connected to the first node Q(N), and a third terminal of the forty-first thin film transistor T41 is connected to the third node Y(N).

Specifically, a gate of the forty-first thin film transistor T41 is connected to the signal output terminal G(N+4) of the (N+4)th stage GOA unit. A source and a drain of the forty-first thin film transistor T41 are respectively connected to the first node Q(N) and the third node Y(N). In this embodiment, the forty-first thin film transistor T41 is a thin film transistor TFT.

During the display period, the gate shutdown signal terminal AGO provides a low potential signal. When the Nth stage GOA unit is finished working and the signal output terminal G(N+4) of the (N+4)th stage GOA unit cascaded with the N stage GOA unit outputs a high potential, the forty-first thin film transistor T41 is turned on. At this time, the potential of the first node Q(N) is pulled down to the low potential provided by the gate shutdown signal terminal AGO.

In some embodiments of the present application, the pull-down maintenance module 40 includes a fifty-first thin film transistor T51, a fifty-second thin film transistor T52, a fifty-third thin film transistor T53, a fifty-fourth thin film transistor T54, a fifty-fifth thin film transistor T55, a fifty-sixth thin film transistor T56, and a forty-second thin film transistor T42.

Both a first terminal and a second terminal of the fifty-first thin film transistor T51 are connected to the constant-voltage high-potential signal terminal VGH, and a second terminal of the fifty-first thin film transistor T51 is connected to a fifth node J(N).

A first terminal of the fifty-second thin film transistor T52 is connected to the first node Q(N), a second terminal of the fifty-second thin film transistor T52 is connected to the fifth node J(N), and a third terminal of the fifty-second thin film transistor T52 terminal is connected to the fourth node M(N).

A first terminal of the fifty-third thin film transistor T53 is connected to the fifth node J(N), a second terminal of the fifty-third thin film transistor T53 is connected to the constant-voltage high-potential signal terminal VGH, and a third terminal of the fifty-third thin film transistor T53 is connected to a sixth node K(N).

A first terminal of the fifty-fourth thin film transistor T54 is connected to the first node Q(N), a second terminal of the fifty-fourth thin film transistor T54 is connected to the sixth node K(N), and a third terminal of the fifty-fourth thin film transistor T54 terminal is connected to the fourth node M(N).

A first terminal of the fifty-fifth thin film transistor T55 is connected to the third node Y(N), a second terminal of the fifty-fifth thin film transistor T55 is connected to the fifth node J(N), and a third terminal of the fifty-fifth thin film transistor T55 terminal is connected to the fourth node M(N).

A first terminal of the fifty-sixth thin film transistor T56 is connected to the third node Y(N), a second terminal of the fifty-sixth thin film transistor T56 is connected to the sixth node K(N), and a third terminal of the fifty-sixth thin film transistor T56 terminal is connected to the fourth node M(N).

A first terminal of the forty-second thin film transistor T42 is connected to the sixth node K(N), a second terminal of the forty-second thin film transistor T42 is connected to the first node Q(N), and a third terminal of the forty-second thin film transistor T42 terminal is connected to the third node Y(N).

Specifically, a gate and a source of the fifty-first thin film transistor T51 and a source of the fifty-third thin film transistor T53 are connected to the constant-voltage high-potential signal terminal VGH. A drain of the fifty-first TFT T51, a gate of the fifty-third TFT T53, a source of the fifty-second TFT T52, and a source of the fifty-fifth TFT T55 are commonly connected to form the fifth node J(N). A drain of the fifty-third thin film transistor T53, a source of the fifty-fourth thin film transistor T54, a source of the fifty-sixth thin film transistor T56, and a gate of the forty-second thin film transistor T42 are commonly connected to form the sixth node K(N). A gate of the fifty-second thin film transistor T52 and a gate of the fifty-fourth thin film transistor T54 are connected to the first node Q(N). A gate of the fifty-fifth TFT T55 and a drain of the forty-second TFT T42 are connected to the third node Y(N). A drain of the fifty-second thin film transistor T52, a drain of the fifty-fourth thin film transistor T54, a drain of the fifty-fifth thin film transistor T55, and a drain of the fifty-sixth thin film transistor T56 are connected to the fourth node M(N). A source of the forty-second thin film transistor T42 is connected to the first node Q(N).

In this embodiment, the pull-down maintenance module 40 further includes a thirty-second thin film transistor T32. A first terminal of the thirty-second thin film transistor T32 is connected to the sixth node K(N), a second terminal of the thirty-second thin film transistor T32 is connected to the second node X(N), and a third terminal of the thirty-second thin film transistor T32 terminal is connected to the fourth node M(N).

Specifically, a gate of the thirty-second thin film transistor T32 is connected to the sixth node K(N), and a source and a drain of the thirty-second thin film transistor T32 are respectively connected to the second node X(N) and the fourth node M(N).

In this embodiment, the fifty-first thin film transistor T51, the fifty-second thin film transistor T52, the fifty-third thin film transistor T53, the fifty-fourth thin film transistor T54, the fifty-fifth thin film transistor T55, the fifty-sixth thin film transistor T56, the forty-second thin film transistor T42 and the thirty-second thin film transistor T32 are all thin film transistors (TFTs).

In this embodiment, the fifty-first thin film transistor T51, the fifty-second thin film transistor T52, the fifty-third thin film transistor T53, the fifty-fourth thin film transistor T54, the fifty-fifth thin film transistor T55, the fifty-sixth thin film transistor T56 together constitute an inverter in the GOA unit.

After the Nth stage GOA unit is finished working, the output signal terminal G(N) of the Nth stage GOA unit needs to continuously output a low potential to the pixel TFT. Therefore, during the display period, the pull-down maintenance module 40 needs to maintain the output signal terminal G(N) at a low potential continuously.

Specifically, during the display period and during the period of the clock signal provided by the Nth stage clock signal line CK from low potential to high potential to low potential, the constant-voltage high-potential signal terminal VGH provides a high potential to turn on the fifty-first thin film transistor T51. The high potential at the first node Q(N) turns on the fifty-second thin film transistor T52 and the fifty-fourth thin film transistor T54. At this time, the sixth node K(N) is pulled down to the low potential provided by the constant-voltage negative-potential signal terminal VSS, and the gate shutdown signal terminal AGO provides a low potential signal. Therefore, at this time, the fifty-fifth TFT T55, the fifty-sixth TFT T56, and the forty-second TFT T42 are all turned off, so that the first node Q(N) maintains a high potential.

When the work of the Nth stage GOA unit is completed and when the signal output terminal G(N+4) of the (N+4)th stage GOA unit cascaded with the Nth stage GOA unit outputs a high potential, the forty-first thin film transistor T41 in the pull-down module 60 is turned on. At this time, the potential of the first node Q(N) is pulled down to the low potential provided by the gate shutdown signal terminal AGO, and finally the output of the output signal terminal G(N) of the Nth stage GOA unit is maintained at a low level.

During the touch period, the gate shutdown signal terminal AGO provides a high potential signal. At this moment, the fifty-fifth thin film transistor T55 and the fifty-sixth thin film transistor T56 are turned on, both the fifth node J(N) and the sixth node K(N) are pulled down to the low potential provided by the constant-voltage negative-potential signal terminal VSS, the inverter constituted by the fifty-first thin film transistor T51, the fifty-second thin film transistor T52, the fifty-third thin film transistor T53, the fifty-fourth thin film transistor T54, the fifty-fifth thin film transistor T55, and the fifty-sixth thin film transistor T56 fails, and the forty-second thin film transistor T42 is turned off. At the same time, because the drain of the forty-first TFT T41 and the drain of the forty-second TFT T42 are both connected to the gate shutdown signal terminal AGO to provide a high potential signal, that is, both the drain of the forty-first TFT T41 and the drain of the forty-second TFT T42 are at a high potential, so that the leakage of the first node Q(N) can be suppressed.

In this application, the fifty-sixth thin film transistor T56 is added to the inverter. In the display period, further stabilizing the sixth node K(N) is pulled down to a low potential, so that the forty-second thin film transistor T42 is turned off more tightly.

After the touch period ends, the gate shutdown signal terminal AGO is switched to a low potential signal. At this time, the GOA unit whose first node Q(N) is at a high potential continues to perform cascading transmission and resumes normal GOA circuit driving.

In some embodiments of the present application, the GOA drive shutdown module 50 includes a drive shutdown thin film transistor Tago. A first terminal of the drive shutdown thin film transistor Tago is connected to the gate shutdown signal terminal AGO, a second terminal of the drive shutdown thin film transistor Tago is connected to the second node X(N), and a third terminal of the drive shutdown thin film transistor Tago is connected to the fourth node M(N).

Specifically, the gate of the thin film transistor Tago is driven to be turned off to be connected to the gate shutdown signal terminal AGO. The source and the drain of the thin film transistor Tago are driven off to be connected to the second node X(N) and the fourth node M(N) respectively. In this embodiment, the drive shutdown thin film transistor Tago is a thin film transistor (TFT).

During the display period, the gate shutdown signal terminal AGO provides a low potential to turn off the drive shutdown thin film transistor Tago. During the touch period, the gate shutdown signal terminal AGO provides a high potential to turn on the drive shutdown thin film transistor Tago. At this time, the output signal terminal G(N) of the Nth stage GOA unit is pulled down to the low potential provided by the constant-voltage negative-potential signal terminal VSS. It is equivalent to locking the output signal terminals G(N) of all GOA units at a low potential during the touch period.

In summary, the present application is equivalent to proposing an inverter structure. The Vin of the inverter structure is connected to the AGO signal input from the gate shutdown signal terminal AGO. This makes the AGO signal combined with the Q-point signal of the first node Q(N) in the same inverter. Use the special timing settings of the AGO signal, specifically: During the regular period, the gate shutdown signal terminal AGO is at a low potential, the fifty-fifth thin film transistor T55 is turned off, and the principle of the inverter is the same as that of the conventional inverter, realizing the conventional pull-down maintenance function. During the touch period, the gate shutdown signal terminal AGO is at a high potential, the fifty-fifth thin film transistor T55 is turned on, and the inverter function is turned off, effectively reducing the leakage of the first node Q(N).

In some embodiments of the present application, the GOA circuit further includes a first reset thin film transistor TrQ. A first terminal of the first reset thin film transistor TrQ is connected to a reset signal terminal Reset, a second terminal of the first reset thin film transistor TrQ is connected to the first node Q(N), and a third terminal of the first reset thin film transistor TrQ is connected to the fourth node M(N).

Specifically, a gate of the first reset thin film transistor TrQ is connected to the reset signal terminal Reset, and a source and a drain of the first reset thin film transistor TrQ are respectively connected to the first node Q(N) and the fourth node M(N). In this embodiment, the first reset thin film transistor TrQ is a thin film transistor TFT.

After any frame is displayed, a reset signal is provided through the reset signal terminal Reset to turn on the first reset thin film transistor TrQ. This pulls down the potential of the first node Q(N) to the low potential provided by the constant-voltage negative-potential signal terminal VSS, thereby realizing the reset of the first node Q(N) of the Nth stage GOA unit.

In some embodiments of the present application, the GOA circuit further includes a second reset thin film transistor TrG. A first terminal of the second reset thin film transistor TrG is connected to the reset signal terminal Reset, a second terminal of the second reset thin film transistor TrG is connected to the second node X(N), and a third terminal of the second reset thin film transistor TrG is connected to the fourth node M(N).

Specifically, a gate of the second reset thin film transistor TrG is connected to the reset signal terminal Reset, and a source and a drain of the second reset thin film transistor TrG are respectively connected to the second node X(N) and the fourth node M(N). In this embodiment, the second reset thin film transistor TrG is a thin film transistor TFT.

After any frame is displayed, a reset signal is provided through the reset signal terminal Reset, so that the second reset thin film transistor TrG is turned on. This pulls down the output potential of the output signal terminal G(N) of the GOA unit to the low potential provided by the constant-voltage negative-potential signal terminal VSS, thereby realizing the reset of the output signal terminal G(N) of the Nth stage GOA unit.

Figure 6:
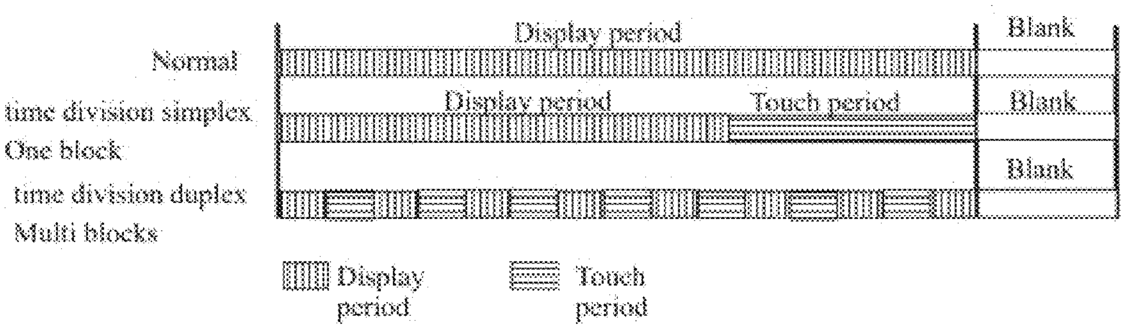
FIG. 6 is a schematic timing diagram of a GOA circuit provided in an embodiment of the present application.

The timing of the GOA circuit of the present application adopts the time-division multiplexing timing sequence shown in FIG. 6. A frame time is divided into multiple display periods and touch periods, effectively enhancing the touch sensitivity of the display panel. In addition, the GOA circuit of the present application is driven by a touch and display driver integration (TDDI).

The working principle of the present application will be described with reference to FIG. 6 and FIG. 7.

(1) During a Display Period (Non-Touch Period):

The gate shutdown signal terminal AGO provides a low potential signal, the drive shutdown TFT Tago, the fifty-fifth TFT T55, and the fifty-sixth TFT T56 are all turned off, so that the pull-down sustain module 40 maintains the pull-down maintenance function.

When the signal output terminal G(N−3) of the (N−3)th stage GOA unit changes from low potential to high potential, the eleventh thin film transistor T11 is turned on, and the first node Q(N) is charged through the capacitor Cbt. Until the voltage at the first node Q(N) satisfies the turn-on condition of the twenty-first thin film transistor T21, the twenty-first thin film transistor T21 is turned on. At this time, the output signal terminal G(N) of the Nth stage GOA unit outputs a low voltage according to the low potential input from the Nth stage clock signal line CK.

When the clock signal provided by the Nth stage clock signal line CK changes from low potential to high potential, the capacitor Cbt stops charging. At this time, the output signal terminal G(N) of the Nth stage GOA unit changes from low potential to high potential according to the high potential input of the Nth stage clock signal line CK, so as to effectively turn on the corresponding pixel TFT.

When the clock signal provided by the mth stage clock signal line Ck changes from a high potential to a low potential, the first node Q(N) remains at a high potential. Therefore, the output signal terminal G(N) of the Nth stage GOA unit changes from high potential to low potential according to the low potential output input by the Nth stage clock signal line CK.

At the same time, in the pull-down maintenance module 40, the constant-voltage high-potential signal terminal VGH provides a high potential to turn on the fifty-first thin film transistor T51. The high potential at the first node Q(N) turns on the fifty-second thin film transistor T52 and the fifty-fourth thin film transistor T54. At this time, the sixth node K(N) is pulled down to the low potential provided by the constant-voltage negative-potential signal terminal VSS, so that the forty-second thin film transistor T42 is turned off. This makes the first node Q(N) maintain a high potential, so that the output signal terminal G(N) of the Nth stage GOA unit maintains an output low potential, so as to effectively turn off the corresponding pixel TFT.

(2) During the Touch Period:

The touch sensor of the display panel is turned on, and the gate shutdown signal terminal AGO provides a high potential signal. The drive shutdown TFT Tago, the fifty-fifth TFT T55, and the fifty-sixth TFT T56 are all turned on. At this time, the fifth node J(N), the sixth node K(N), and all output signal terminals G(N) in the pull-down maintenance module 40 are pulled down to the low potential provided by the constant-voltage negative-potential signal terminal VSS. The forty-second thin film transistor T42 is turned off, and the pull-down maintenance module 40 and all output signal terminals G(N) are disabled.

The drain of the forty-first TFT T41 and the drain of the forty-second TFT T42 are both connected to the gate shutdown signal terminal AGO to provide a high potential signal, that is, both the drain of the forty-first TFT T41 and the drain of the forty-second TFT T42 are at a high potential, so that the leakage of the first node Q(N) can be suppressed.

Figure 7:
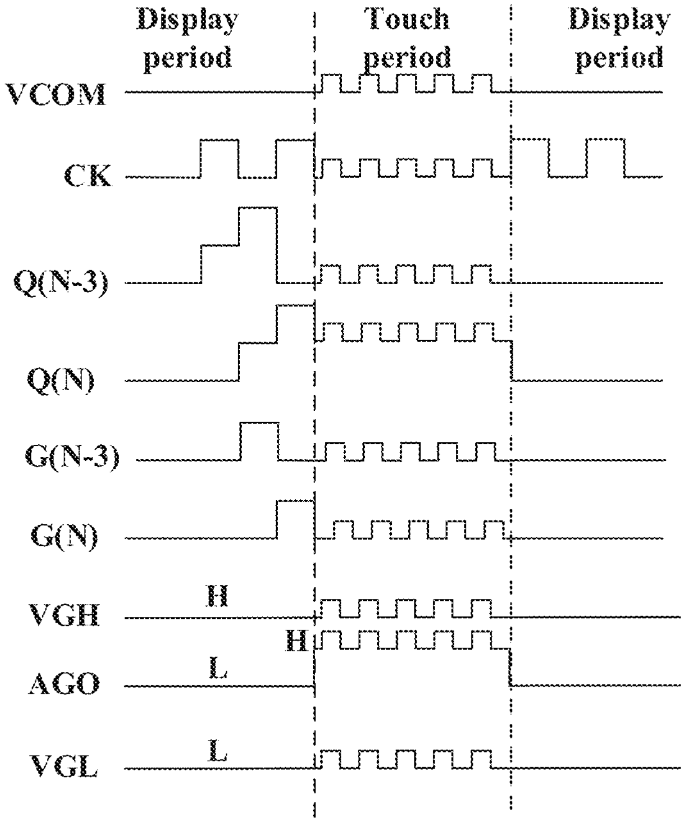
FIG. 7 is a schematic timing diagram of a GOA circuit provided in an embodiment of the present application.

As shown in FIG. 7, all GOA signals follow the COM modulation during the touch period, maintaining the same coupling effect as in-plane. This effectively reduces the capacitive coupling effect (touch Loading) with the in-plane line during the touch period.

After the touch period is over, the gate shutdown signal terminal AGO is switched to a low potential signal. At this time, the GOA unit whose first node Q(N) is at a high potential continues to perform cascading transmission, and resumes normal GOA circuit driving.

The present application also provides a display panel. The display panel includes multiple rows of sub-pixels and the GOA circuit in any one embodiment of the present application. The GOA circuit is electrically connected to multiple rows of sub-pixels for driving the multiple rows of sub-pixels to emit light. The display panel may be a passive light-emitting display panel, such as a liquid crystal display panel. The display panel can also be an active light emitting display panel, such as an organic light emitting diode display panel, a mini light emitting diode display panel, and a micro light emitting diode display panel.

A GOA circuit and a display panel provided in the embodiments of the present application have been introduced in detail above. In the descriptions, specific examples are used to illustrate the principle and implementation of the present invention. The descriptions of the above embodiments are only used to help understand the method and core idea of the present invention. Further, for those skilled in the art, according to the idea of the present invention, there will be changes in the specific implementation and application range. In summary, the contents of this specification should not be construed as limiting the present invention.

What is claimed is:

1. A gate driver on array (GOA) circuit, comprising:

a plurality of GOA units in cascade, wherein each of the GOA units comprises a pull-up control module, a pull-up module, a capacitor module, pull-down maintenance module, a pull-down module, and a GOA drive shutdown module;

wherein the pull-up control module is connected to a signal output terminal G(N−3) of a (N−3) stage GOA unit, a constant-voltage high-potential signal terminal, and a first node, wherein N is a natural number;

wherein the pull-up module is connected to a clock signal line, the first node, and a second node;

wherein the capacitor module is connected to the first node and the second node;

wherein the pull-down maintenance module is connected to the constant-voltage high-potential signal terminal, the first node, the second node, a third node, and a fourth node, wherein the third node is connected to a gate shutdown signal terminal, and the fourth node is connected to a constant-voltage negative-potential signal terminal;

wherein the pull-down module is connected to a signal output terminal G(N+4) of a (N+4)th stage GOA unit, the first node, and the third node;

wherein the GOA drive shutdown module is connected to a gate shutdown signal terminal, the second node, and the fourth node;

wherein the gate shutdown signal terminal is configured to provide a low potential signal during a display period and is configured to provide a high potential signal during a touch period, when the gate shutdown signal terminal provides the low potential signal, the pull-down maintenance module maintains a pull-down maintenance function, and when the gate shutdown signal terminal provides the high potential signal, the pull-down maintenance module becomes disabled;

wherein in the display period, a periodic clock signal and an output signal of a previous stage are configured to control the pull-up control module to charge a capacitor of the first node, the periodic clock signal and a voltage of the first node are configured to control opening or closing of the pull-up module, when the periodic clock signal becomes high potential, an output signal terminal G(N) of a Nth stage GOA unit is synchronously made to be high potential, and the pull-down maintenance module is configured to maintain the output signal terminal G(N) of the Nth stage GOA unit at a low potential.

2. The GOA circuit according to claim 1, wherein the pull-up control module comprises an eleventh thin film transistor, a first terminal of the eleventh thin film transistor is connected to the signal output terminal G(N−3) of the (N−3)th stage GOA unit, a second terminal of the eleventh thin film transistor is connected to the constant-voltage high-potential signal terminal, and a third terminal of the eleventh thin film transistor is connected to the first node.

3. The GOA circuit according to claim 2, wherein the pull-up module comprises a twenty-first thin film transistor, a first terminal of the twenty-first thin film transistor is connected to the first node, a second terminal of the twenty-first thin film transistor is connected to the clock signal line, and a third terminal of the twenty-first thin film transistor is connected to the second node.

4. The GOA circuit according to claim 3, wherein the pull-down module comprises a forty-first thin film transistor, a first terminal of the forty-first thin film transistor is connected to the signal output terminal G(N+4) of the (N+4)th stage GOA unit, a second terminal of the forty-first thin film transistor is connected to the first node, and a third terminal of the forty-first thin film transistor is connected to the third node.

5. The GOA circuit according to claim 4, wherein the pull-down maintenance module comprises a fifty-first thin film transistor, a fifty-second thin film transistor, a fifty-third thin film transistor, a fifty-fourth thin film transistor, a fifty-fifth thin film transistor, a fifty-sixth thin film transistor, and a forty-second thin film transistor;

wherein a first terminal and a second terminal of the fifty-first thin film transistor are connected to the constant-voltage high-potential signal terminal, and a second terminal of the fifty-first thin film transistor is connected to a fifth node;

wherein a first terminal of the fifty-second thin film transistor is connected to the first node, a second terminal of the fifty-second thin film transistor is connected to the fifth node, and a third terminal of the fifty-second thin film transistor is connected to the fourth node;

wherein a first terminal of the fifty-third thin film transistor is connected to the fifth node, a second terminal of the fifty-third thin film transistor is connected to the constant-voltage high-potential signal terminal, and a third terminal of the fifty-third thin film transistor is connected to a sixth node;

wherein a first terminal of the fifty-fourth thin film transistor is connected to the first node, a second terminal of the fifty-fourth thin film transistor is connected to the sixth node, and a third terminal of the fifty-fourth thin film transistor is connected to the fourth node;

wherein a first terminal of the fifty-fifth thin film transistor is connected to the third node, a second terminal of the fifty-fifth thin film transistor is connected to the fifth node, and a third terminal of the fifty-fifth thin film transistor is connected to the fourth node;

wherein a first terminal of the fifty-sixth thin film transistor is connected to the third node, a second terminal of the fifty-sixth thin film transistor is connected to the sixth node, and a third terminal of the fifty-sixth thin film transistor is connected to the fourth node;

wherein a first terminal of the forty-second thin film transistor is connected to the sixth node, a second terminal of the forty-second thin film transistor is connected to the first node, and a third terminal of the forty-second thin film transistor is connected to the third node.

6. The GOA circuit according to claim 5, wherein the pull-down maintenance module further comprises a thirty-second thin film transistor, a first terminal of the thirty-second thin film transistor is connected to the sixth node, a second terminal of the thirty-second thin film transistor is connected to the second node, and a third terminal of the thirty-second thin film transistor is connected to the fourth node.

7. The GOA circuit according to claim 6, wherein the GOA drive shutdown module comprises a drive shutdown thin film transistor, a first terminal of the drive shutdown thin film transistor is connected to the gate shutdown signal terminal, a second terminal of the drive shutdown thin film transistor is connected to the second node, and a third terminal of the drive shutdown thin film transistor is connected to the fourth node.

8. The GOA circuit according to claim 1, wherein the GOA circuit further comprises a first reset thin film transistor, a first terminal of the first reset thin film transistor is connected to a reset signal terminal, a second terminal of the first reset thin film transistor is connected to the first node, and a third terminal of the first reset thin film transistor is connected to the fourth node.

9. The GOA circuit according to claim 1, wherein the GOA circuit further comprises a second reset thin film transistor, a first terminal of the second reset thin film transistor is connected to a reset signal terminal, a second terminal of the second reset thin film transistor is connected to the second node, and a third terminal of the second reset thin film transistor is connected to the fourth node.

10. A display panel, comprising:

a plurality of rows of sub-pixels; and a GOA circuit electrically connected to the plurality of rows of sub-pixels and configured to drive the plurality of rows of sub-pixels to emit light;

wherein the GOA circuit comprises a plurality of GOA units in cascade, each of the GOA units comprises a pull-up control module, a pull-up module, a capacitor module, a pull-down maintenance module, a pull-down module, and a GOA drive shutdown module;

wherein the pull-up control module is connected to a signal output terminal G(N−3) of a (N−3) stage GOA unit, a constant-voltage high-potential signal terminal, and a first node, wherein N is a natural number;

wherein the pull-up module is connected to a clock signal line, the first node, and a second node;

wherein the capacitor module is connected to the first node and the second node;

wherein the pull-down maintenance module is connected to the constant-voltage high-potential signal terminal, the first node, the second node, a third node, and a fourth node, wherein the third node is connected to a gate shutdown signal terminal, and the fourth node is connected to a constant-voltage negative-potential signal terminal;

wherein the pull-down module is connected to a signal output terminal G(N+4) of a (N+4)th stage GOA unit, the first node, and the third node;

wherein the GOA drive shutdown module is connected to a gate shutdown signal terminal, the second node, and the fourth node;

wherein the gate shutdown signal terminal is configured to provide a low potential signal during a display period and is configured to provide a high potential signal during a touch period, when the gate shutdown signal terminal provides the low potential signal, the pull-down maintenance module maintains a pull-down maintenance function, and when the gate shutdown signal terminal provides the high potential signal, the pull-down maintenance module becomes disabled;

wherein in the display period, a periodic clock signal and an output signal of a previous stage are configured to control the pull-up control module to charge a capacitor of the first node, the periodic clock signal and a voltage of the first node are configured to control opening or closing of the pull-up module, when the periodic clock signal becomes high potential, an output signal terminal G(N) of a Nth stage GOA unit is synchronously made to be high potential, and the pull-down maintenance module is configured to maintain the output signal terminal G(N) of the Nth stage GOA unit at a low potential.

11. The display panel according to claim 10, wherein the pull-up control module comprises an eleventh thin film transistor, a first terminal of the eleventh thin film transistor is connected to the signal output terminal G(N−3) of the (N−3)th stage GOA unit, a second terminal of the eleventh thin film transistor is connected to the constant-voltage high-potential signal terminal, and a third terminal of the eleventh thin film transistor is connected to the first node.

12. The display panel according to claim 11, wherein the pull-up module comprises a twenty-first thin film transistor, a first terminal of the twenty-first thin film transistor is connected to the first node, a second terminal of the twenty-first thin film transistor is connected to the clock signal line, and a third terminal of the twenty-first thin film transistor is connected to the second node.

13. The display panel according to claim 12, wherein the pull-down module comprises a forty-first thin film transistor, a first terminal of the forty-first thin film transistor is connected to the signal output terminal G(N+4) of the (N+4)th stage GOA unit, a second terminal of the forty-first thin film transistor is connected to the first node, and a third terminal of the forty-first thin film transistor is connected to the third node.

14. The display panel according to claim 13, wherein the pull-down maintenance module comprises a fifty-first thin film transistor, a fifty-second thin film transistor, a fifty-third thin film transistor, a fifty-fourth thin film transistor, a fifty-fifth thin film transistor, a fifty-sixth thin film transistor, and a forty-second thin film transistor;

wherein a first terminal and a second terminal of the fifty-first thin film transistor are connected to the constant-voltage high-potential signal terminal, and a second terminal of the fifty-first thin film transistor is connected to a fifth node;

wherein a first terminal of the fifty-second thin film transistor is connected to the first node, a second terminal of the fifty-second thin film transistor is connected to the fifth node, and a third terminal of the fifty-second thin film transistor is connected to the fourth node;

wherein a first terminal of the fifty-third thin film transistor is connected to the fifth node, a second terminal of the fifty-third thin film transistor is connected to the constant-voltage high-potential signal terminal, and a third terminal of the fifty-third thin film transistor is connected to a sixth node;

wherein a first terminal of the fifty-fourth thin film transistor is connected to the first node, a second terminal of the fifty-fourth thin film transistor is connected to the sixth node, and a third terminal of the fifty-fourth thin film transistor is connected to the fourth node;

wherein a first terminal of the fifty-fifth thin film transistor is connected to the third node, a second terminal of the fifty-fifth thin film transistor is connected to the fifth node, and a third terminal of the fifty-fifth thin film transistor is connected to the fourth node;

wherein a first terminal of the fifty-sixth thin film transistor is connected to the third node, a second terminal of the fifty-sixth thin film transistor is connected to the sixth node, and a third terminal of the fifty-sixth thin film transistor is connected to the fourth node;

wherein a first terminal of the forty-second thin film transistor is connected to the sixth node, a second terminal of the forty-second thin film transistor is connected to the first node, and a third terminal of the forty-second thin film transistor is connected to the third node.

15. The display panel according to claim 14, wherein the pull-down maintenance module further comprises a thirty-second thin film transistor, a first terminal of the thirty-second thin film transistor is connected to the sixth node, a second terminal of the thirty-second thin film transistor is connected to the second node, and a third terminal of the thirty-second thin film transistor is connected to the fourth node.

16. The display panel according to claim 15, wherein the GOA drive shutdown module comprises a drive shutdown thin film transistor, a first terminal of the drive shutdown thin film transistor is connected to the gate shutdown signal terminal, a second terminal of the drive shutdown thin film transistor is connected to the second node, and a third terminal of the drive shutdown thin film transistor is connected to the fourth node.

17. The display panel according to claim 10, wherein the GOA circuit further comprises a first reset thin film transistor, a first terminal of the first reset thin film transistor is connected to a reset signal terminal, a second terminal of the first reset thin film transistor is connected to the first node, and a third terminal of the first reset thin film transistor is connected to the fourth node.

18. The display panel according to claim 10, wherein the GOA circuit further comprises a second reset thin film transistor, a first terminal of the second reset thin film transistor is connected to a reset signal terminal, a second terminal of the second reset thin film transistor is connected to the second node, and a third terminal of the second reset thin film transistor is connected to the fourth node.

19. The display panel according to claim 10, wherein a timing of the GOA circuit comprises a time-division multiplexing timing configured to divide one frame time into a plurality of display periods and touch periods.

20. The display panel according to claim 10, wherein the GOA circuit is driven by a touch and display driver integration (TDDI).

* * * * *